(12) United States Patent
Yadav et al.

(10) Patent No.: US 11,675,668 B2
(45) Date of Patent: Jun. 13, 2023

(54) LEVERAGING A CLOUD-BASED OBJECT STORAGE TO EFFICIENTLY MANAGE DATA FROM A FAILED BACKUP OPERATION

(71) Applicant: EMC IP Holding Company LLC, Hopkinton, MA (US)

(72) Inventors: Sunil Yadav, Bangalore (IN); Shelesh Chopra, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 17/462,670

(22) Filed: Aug. 31, 2021

(65) Prior Publication Data
US 2023/0065486 A1    Mar. 2, 2023

(51) Int. Cl.
*G06F 11/14* (2006.01)
(52) U.S. Cl.
CPC ...... *G06F 11/1451* (2013.01); *G06F 2201/80* (2013.01); *G06F 2201/82* (2013.01)
(58) Field of Classification Search
None
See application file for complete search history.

(56) References Cited

U.S. PATENT DOCUMENTS

| | | | |
|---|---|---|---|
| 7,185,048 B2* | 2/2007 | Arakawa | H04L 63/18 709/202 |
| 8,688,931 B2* | 4/2014 | Kottomtharayil | G06F 3/067 714/6.32 |
| 2004/0088508 A1* | 5/2004 | Ballard | G06F 11/1456 714/E11.12 |
| 2013/0124929 A1* | 5/2013 | Harada | G06F 11/0751 714/49 |
| 2016/0342483 A1* | 11/2016 | Klingenberg | G06F 11/1461 |
| 2021/0157694 A1* | 5/2021 | Dye | H04L 47/125 |

* cited by examiner

*Primary Examiner* — Belix M Ortiz Ditren
(74) *Attorney, Agent, or Firm* — Dergosits & Noah LLP; Todd A. Noah (57) ABSTRACT

Described is a system (and method) for leveraging data previously transferred to a cloud-based object storage as part of a failed backup when performing a subsequent backup operation. The system may leverage the native configuration of an object storage that may retain certain data even when a backup operation is classified as a failed operation. To provide such capabilities, the system may store specialized metadata that tracks which backups have failed and metadata indicating which backup data has not been committed. Accordingly, upon a subsequent backup operation, the system may expediently refer to the stored metadata to identify retained backup data that may be reused for the subsequent backup. As a result, the system may improve the efficiency of a backup procedure by reducing the amount of data required to be transferred from the backup source.

20 Claims, 4 Drawing Sheets

LEVERAGING A CLOUD-BASED OBJECT STORAGE TO EFFICIENTLY MANAGE DATA FROM A FAILED BACKUP OPERATION

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. As part of the data protection and recovery infrastructure, clients may rely on third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). To limit the amount of data transferred during a backup procedure, the client data may be stored to an object storage using incremental backups. For example, only the changes to the client data since the previous backup will be stored as part of the incremental backup. In addition, cloud-based storages often manage data in a specialized manner. For example, cloud-based storages often have certain retention policies that preserves data that has been transmitted, even partially, to the cloud. As with any backup procedure, backup failures associated with transmitting data to the cloud may occur for any number of reasons. When such a failure occurs, the backup service often re-initiates the failed backup operation. However, re-initiating a failed backup operation often incurs the same resource requirements as a completely new backup operation. This in turn increases potential storage costs. Accordingly, there is a continued need to provide efficient mechanisms when managing data associated with failed backup operations to a cloud-based object storage.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for leveraging a cloud-based object storage to efficiently manage data from a failed backup operation. More particularly, the system may leverage data previously transferred to the object storage as part of a failed backup when performing a subsequent backup operation. To provide such functionality, the system may leverage the native configuration of an object storage that may retain certain data even when a backup operation is classified as a failed operation. For example, despite the backup operation failing, some of the backup data may have been transferred to the object storage. This transferred data may be retained by the object storage despite the data not being committed by a backup application. Accordingly, the system may rely on the non-committed backup data for a subsequent backup operation. As a result, the system may improve the efficiency of a backup procedure by limiting the amount of data transferred from the backup source, and thus, reducing the backup duration and associated storage costs.

To provide such capabilities, the system may store specialized metadata that tracks which backups have failed and information associated with the backup data. For example, the system may store metadata indicating which backup data was stored as part of a failed backup operation and has not been committed. Accordingly, upon a subsequent backup operation, the system may expediently refer to the stored metadata to determine whether any previous backups have failed and/or identify retained backup data that may be reused for the subsequent backup. Upon discovering such retained data, the system may merely commit the retained data to the object storage thus limiting the amount of backup data transferred to the object storage.

It should be noted that in some embodiments, the system may be implemented as part of an incremental backup infrastructure. For example, in order to conserve storage space, a backup service may perform incremental backups when storing client backup data to the object storage. However, the system may perform a full restore of the client data to a point-in-time of any incremental backup by reconstructing (e.g. synthetically) the client data as if a full backup was performed. Accordingly, the system may also manage backup data and its associated metadata in a configuration that works in conjunction with an incremental backup infrastructure.

As referred to herein, a failed backup operation (or procedure, command, instruction, etc.) may include a backup that results in less than all of the required backup data being successfully transferred and/or stored to the object storage. For example, a failed backup operation may be the result of the backup data being corrupted. As another example, a failed backup operation may be the result of a transmission error (e.g. disconnection) between the client/backup server and the object storage that does not rectify during a backup procedure. When a backup operation fails, the system (e.g. backup application) may not commit any of the data that was transferred, and even, successfully stored to the object storage. For example, in some embodiments, when an incremental backup infrastructure is implemented, the system may maintain a complicated set of interdependencies of backup data, and thus, may delay committing backup data transferred as part of a failed backup operation to maintain the integrity of such interdependencies. Instead, the system may attempt to re-initiate the backup procedure, or skip the backup procedure and wait until the next scheduled backup.

As referred to herein, a commit operation (or instruction, command, procedure, etc.) finalizes a backup operation such that the associated backup data may be relied upon to perform a restore. Thus, in some embodiments, by not committing backup data of an associated backup, the system may not consider the backup and/or associated backup data as usable for a restore operation. In other words, in some embodiments, non-committed backup data stored on the object storage may include backup data that is retained by the object storage, but data not relied upon (e.g. by a backup application) for a restore operation. Accordingly, in some embodiments, backup data transferred during such a backup may appear unavailable to a user under normal circumstances. However, as further described herein, this non-committed backup data may still be leveraged by the system to improve backup efficiency and reduce potential storage costs.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
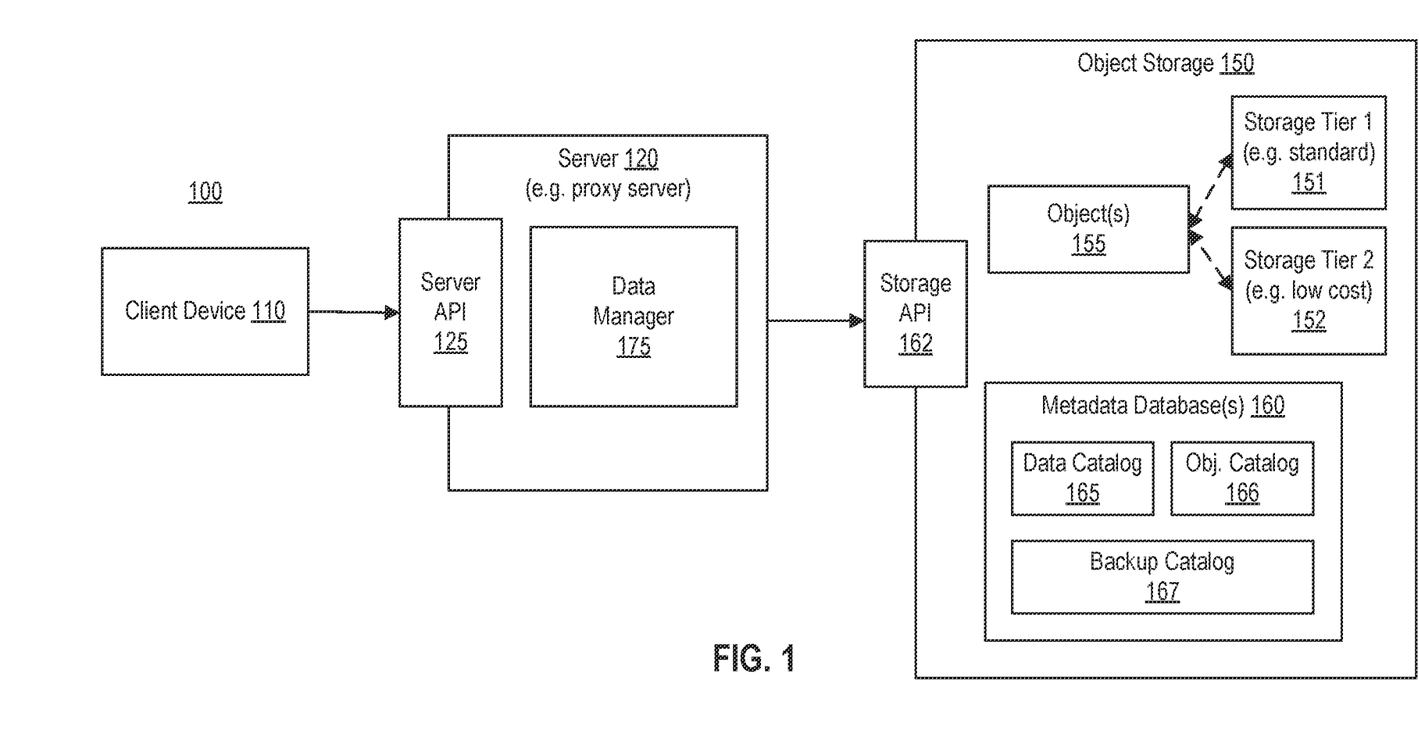
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. In some embodiments, an object may include a unit of storage used by a cloud-based object storage and may include a collection of objects that may be referred to as containers, buckets, and the like (e.g. depending on the cloud-based storage provider). For example, these containers or buckets may be associated with a policy that determines what actions can be performed in association with the objects stored therein. As shown, the object storage 150 may include various storage tiers including storage tier 1 151, and storage tier 2 152. Accordingly, objects 155 (e.g. backed up client data) may be distributed amongst these storage tiers (or classes). For example, each storage tier may have different performance characteristics such as latency, storage capacity, bandwidth, durability, etc., and thus, may be associated with different storage costs. For example, the storage cost may include a time-based cost per unit of storage (e.g. GB/month), retrieval costs, performance costs, etc. For instance, higher performance tiers may be associated with increased costs. For example, storage tier 1 151 may be a standard (or high performance) storage tier that is associated with a first storage cost (or cost per unit of storage), and storage tier 2 152 may be an archival or low-cost storage tier that is associated with a second storage cost (or cost per unit of storage). For example, the storage cost (e.g. GB/month) associated with storage tier 2 152 may be lower than the storage cost associated with storage tier 1 151. Thus, efficiently storing data on a lower tier storage may provide substantial cost savings to a subscriber (e.g. a backup service provider, or user) of the cloud-based storage service. For example, storage tier 1 151 may have a cost of 2.3 cents (or $0.023) per GB/month, while storage tier 2 152 may have a cost of 0.4 cents (or $0.004) per GB/month. Accordingly, re-tiering data to storage tier 2 152 would result in a significant reduction in storage costs. It should be noted that other storage costs (or fees) such as access fees or bandwidth fees may also be reduced using a lower cost storage tier. In addition, although only two storage tiers are shown, additional storage tiers with varying costs are also contemplated.

The client device 110 may use the server 120 as an intermediary for managing client backup data stored on the object storage 150. In some embodiments, the server 120 may include, or work in conjunction with, various backup components (e.g. products) that can perform backup operations across physical and virtual environments. These backup components (e.g. backup application, backup appliance, backup server, etc.) can be implemented in various forms, such as a virtual, physical, or native public cloud appliance to fit the requirements of a particular configuration, and can be used with various types of data protection environments, including public and private object storage clouds. The server 120 may also provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 162. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. In some embodiments, the server API 125 may include operations for deleting and/or re-tiering data (e.g. objects) stored on the object storage 150. For example, a re-tiering operation may move an object from a first storage tier (e.g. storage tier 1 151) to a second (or lower) storage tier (e.g. storage tier 2 152). It should be noted that the same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 162. In some embodiments, the storage API 162 may include only a standard set of storage operations. Accordingly, the server 120 may implement efficient storage and recovery procedures as further described herein.

As described, the server 120 may manage backed-up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as a garbage collection schedule. In addition, the data manager 175 may direct (or control, initiate, etc.) other components of the operating environment 100 to perform various processes as further described herein.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) such that it is accessible by the server 120. For example, when the metadata database 160 resides on the object storage 150, the server 120 may access (e.g. update) the metadata database 160 by accessing the storage API 162. In addition, portions of the metadata database may be cached on a memory (or storage) of the server 120 to further improve performance of various backup or restore operations.

The metadata database 160 may store metadata associated with client data stored on the client device 110 and/or backed up to the object storage 150. The metadata database 160 may also store various types of backup information associated with the backed-up client data and/or backups performed.

For example, the metadata database 160 may include a data catalog (or table, database, index, etc.) 165. The data catalog 165 may store information associated with the data stored as part of each backup. For example, the information may include a point-in-time the client data was backed up, a storage location of the backed-up client data (including storage tier), an object ID to which the backed-up client data is stored, whether data the data has been committed, and various other types of information. Accordingly, a data catalog 165 (or instance thereof) may be updated after each backup is performed. In some embodiments, the data catalog 165 may be maintained for a particular account (e.g. user, client, customer, etc.) associated with the object storage 150. The data catalog 165 may also store various types of backup information associated with the backed-up client data.

The metadata database 160 may include an object catalog (or table, database, index, etc.) 166 that stores information associated with the objects 155. For example, the information may include the point-in-time the object was created, data such as data IDs of backup data stored by the object, data offsets of data stored within the object, a storage location of the object, and other types of information that may be associated with an object such as the earliest and latest backup that references a particular object as further described herein.

The metadata database 160 may also include a backup catalog (or index, table, database, etc.) 167 that stores information associated with each backup performed to the object storage 150. For example, the backup catalog 167 may include backup times specifying when each backup was performed, a backup expiration time, a type of backup (e.g. full or incremental), whether the backup was a success or failure, the amount of data that was stored before the backup failed, and any other information that may be associated with performing a backup. In addition, the backup catalog 167 may also include a list of objects required to perform a full restore to each of the backup times.

Figure 2:
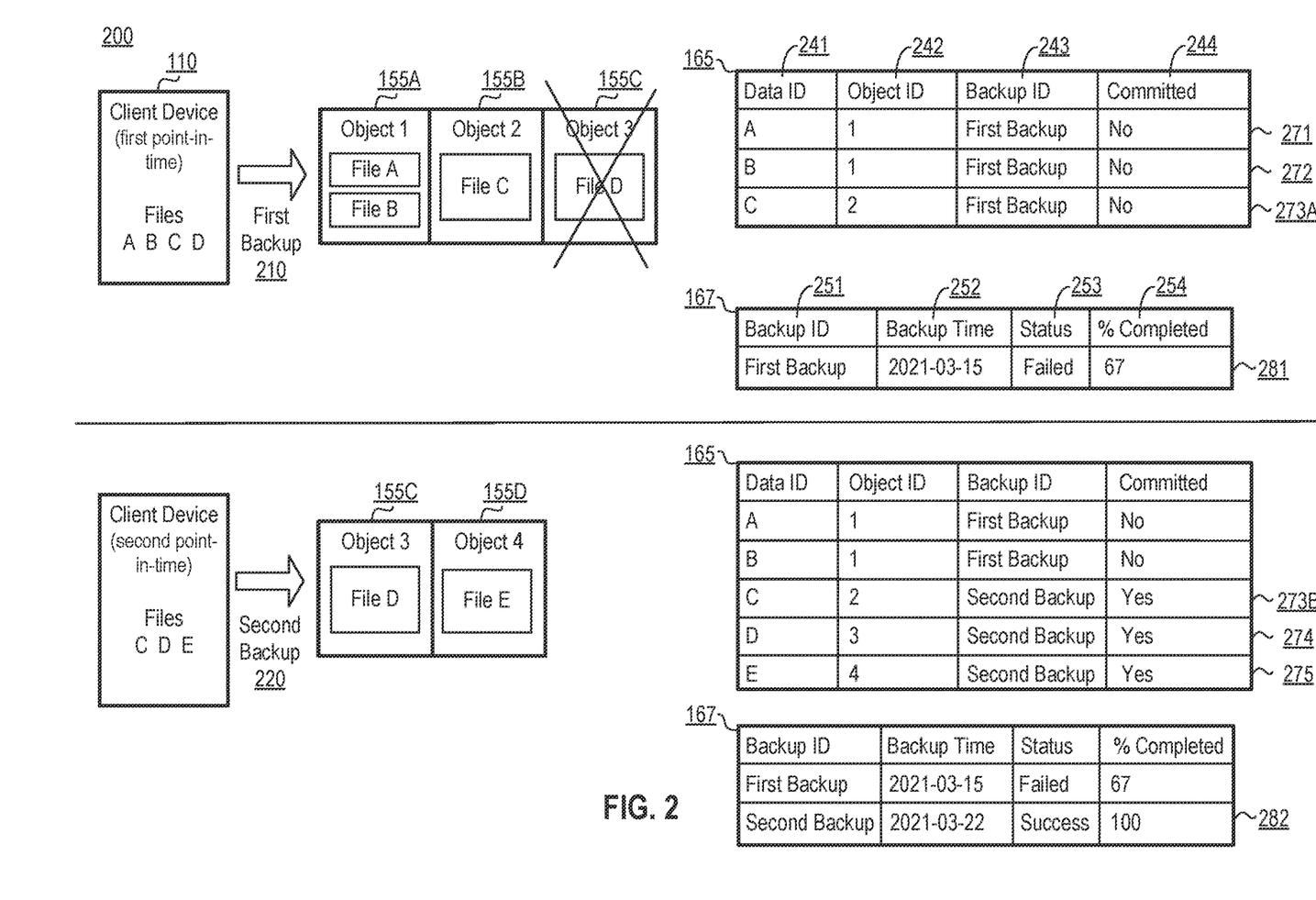
FIG. 2 is a diagram illustrating an example data configuration used to leverage backup data stored as part of a failed backup according to one or more embodiments of the disclosure.

FIG. 2 is a diagram 200 illustrating an example data configuration used to leverage backup data stored as part of a failed backup according to one or more embodiments of the disclosure. More particularly, diagram 200 shows an example data configuration including storing backup data within one or more objects 155 and metadata within a data catalog 165 and a backup catalog 167. In this example, the client data includes files although any type of data is contemplated as being backed up. As shown, the client device 110 at a first point-in-time stores files A, B, C, and D. Accordingly, as part of the first backup 210, which in this example is a full backup, the server stores the files within newly created objects 1, and 2 (e.g. objects 155A, and 155B respectively) of the object storage. In other words, objects 1, and 2 may be associated with the first backup 210 and/or the first point-in-time. In some embodiments, each object 155 may be configured to store a certain amount of data that is specialized for the type of data to be backed up. For example, each of the objects 155 may be configured to store an amount of data that is specialized for client files (e.g. approximately 4 MB). Accordingly, to efficiently utilize storage space on the object storage, the server may perform a packing (or grouping, combining, etc.) of data based on the amount of data an object 155 is configured to store. Thus, in this example, the server may attempt to pack files into each of the objects 155 such that each object stores approximately 4 MB of data. For example, the server may store (e.g. pack) backup data for files A and B, which are approximately 2 MB each in size, within object 155A, and file C, which is approximately 4 MB in size, within object 155B. However, the backup procedure may fail before successfully transferring and/or storing the backup data for file D, which is approximately 4 MB, within object 155C. Accordingly, as shown in this example, the backup data for file D has not been stored by the object storage.

As described, the system may store metadata that may be leveraged to improve backup efficiency. In some embodiments, this metadata may be stored as part of a data catalog 165 and a backup catalog 167, either of which may be part of, or associated with, a metadata database (e.g. metadata database 160).

More particularly, the server may store specialized metadata associated with the backup data stored, or attempted to be stored, by the object storage as part of the first backup 210. As shown in this example, the metadata associated with the backup data for files A, B, and C may be stored as part of a data catalog 165. More particularly, the data catalog 165 may store various types of information including a data (or backup data) identifier (ID) 241, object ID 242, a backup ID 243, and a committed value (or status) 244. The data ID 241 may uniquely identify backup data stored by the object storage. The object ID 242 may uniquely identify the object to which particular backup data is stored. The backup ID 243 may uniquely identify the backup that stored the particular backup data. The committed value 244 may indicate whether the particular backup data has been committed to the object storage.

The data catalog 165 may include additional information. In some embodiments, the data catalog 165 may also store the latest (e.g. most recent) backup (not shown) that references the corresponding backup data. For example, the latest backup may correspond to the most recent incremental backup that would need to retrieve the backup data from the corresponding object in order to perform a full restore. As referred to herein, in some embodiments, backup data or objects referenced by a particular backup indicate backup data or objects that are required to perform a full recovery to the point-in-time of that backup. In some embodiments, the data catalog 165 may also include an expiration time (not shown). The expiration time may be user-configurable and may indicate when backup data is deemed expired. For example, the expiration time may identify the time at which the corresponding backup data (or object) may be removed from the object storage to free up storage space.

In addition, the server may store metadata associated with each backup. For example, metadata associated with each backup may be stored as part of a backup catalog 167. In some embodiments, the server may update the backup catalog 167 in response to each backup performed. As shown, the backup catalog 167 may include a backup identifier (ID) 251, a backup time 252, a backup status 253, and a percentage (%) completed value 254. The backup ID 251 (which may correspond to backup ID 243) may uniquely identify the performed backup. In some embodiments, the backup ID 251 may be linked to (or referenced by, associated with, etc.) entries in the data catalog 165. For example, the backup ID 251 of entry 281 corresponds to the first backup 210, and thus, may be linked to entries 271, 272, and 273A of the data catalog 165. The backup time 252 may be a time associated with the performed backup. For example, the backup time 252 may be a point-in-time of when the backup was performed. The backup status 253 may indicate whether the backup performed results in a completed or failed backup operation. The percentage completed value 254 may indicate what percentage of the backup was completed before the backup failed. For example, the percentage completed value 254 may indicate how much of the required backup data was transferred and stored by the object storage despite the backup failing.

Returning to the example shown, in response to performing (or attempting to perform) the first backup 210, the server may update the data catalog 165. As described, the first backup 210 failed, but the system store specialized metadata. More specifically, as shown, the server may store (or add, create, update, etc.) entries 271, 272, and 273A within the data catalog 165 that correspond to the successfully transferred and stored backup data for files A, B, and C respectively. Entry 271 corresponds to backup data for file A, and as shown, identifies backup data A as the data ID 241, identifies object 1 as the object ID 242, identifies the first backup as the backup ID 243, and indicates that the backup data for file A is not committed for the committed value 244. Continuing with the updates to the data catalog 165 based on the first backup 210, entries 272, and 273A correspond to the backup data for files B, and C respectively, and as shown, identify backup data B, and C, respectively as the data IDs 241, identify objects 1, and 2 respectively as the object IDs, identify the first backup as the backup ID 243, and indicate the backup data for files B, and C are not committed for the committed value 244.

Despite the first backup 210 failing before successfully storing the backup data for file D to the object storage, in some embodiments, the server may still store an entry for metadata associated with the backup data for file D. Although not shown, such an entry may identify the first backup as the backup ID (e.g. ID 243), and indicate the backup data for file D is not committed (e.g. as the committed value 244). However, because the backup data for file D is not stored by the object storage, the server in such embodiments may indicate a null value (or equivalent) for the object ID (e.g. object ID 242). In other words, in such embodiments, based on the stored metadata, a determination may be made that the backup data for file D failed to be stored to the object storage.

In addition, the server may store metadata associated with the backup within the backup catalog 167, in response to performing the first backup 210. More specifically, as shown, the server may update the backup catalog 167 to include (or add, create, etc.) entry 281, which is associated with the first backup 210. As shown, entry 281 identifies the first backup (e.g. backup 210) as the backup ID 251, 2021-03-15 as the backup time 252, indicates the first backup 210 was a failed backup operation as the backup status 253, and 67% as the percentage completed 254. In other words, based on the metadata stored for entry 281, a determination may be made that the first backup 210 resulted in a failure (e.g. failed to successfully complete), but that 67% of the backup data required to perform the backup was successfully stored by the object storage.

After the first backup 210, the server may perform a second backup 220. In this example, the files stored by the client device 110 at the second point-in-time include files C, D, and E. For example, files A and B may have been deleted since the first point-in-time, and file E may be a new file added to the client device 110 since the first point-in-time.

With respect to the second backup 220, although files C, and D were included as part of the first backup 210, the system may backup these files since the first backup 210 failed. Thus, as part of the second backup 220, the server may store backup data for file D within object 3 (e.g. object 155C), and backup data for file E in object 4 (e.g. object 155D). However, because the backup data for file C was already transferred and stored by the object storage successfully in the first backup 210, the server does not transfer the backup data for file C again. Instead, the server may leverage the backup data for file C that was stored as part of a failed backup. To leverage such data, the server may update the metadata stored in the data catalog 165. More particularly, the server may update previous entry 273A to indicate that the backup data for file C is stored in object 2, but is now associated with the second backup as shown in updated entry 273B. In addition, the server may now commit the backup data for file C, and accordingly, may update entry 273A to indicate that the backup data for file C is now committed as shown in updated entry 273B. In other words, the server has efficiently leveraged the backup data that was previously associated with a failed backup by merely updated its associated metadata. In addition, as shown, in response to the second backup 220, the server may update the data catalog 165 to include entries 274, and 275, which store metadata associated with the backup data for files D, and E respectively. As shown, entries 274, and 275 indicate that the backup data for files D, and E are stored in objects 3, and 4 respectively, are associated with the second backup, and that the backup data is committed. It should be noted that because the backup data for file D was not successfully stored as part of the first backup 210, the server transferred such data from the client device 110 for storage onto the object storage as part of the second backup 220. Moreover, as shown, after performing the second backup 220, the server does not commit the backup data for files A and B, and accordingly, such data may be marked for removal. For example, such data may be removed by a garbage collection process.

In addition, the server may also update the backup catalog 167 in response to performing the second backup 220. As shown, entry 282 identifies the second backup as the backup ID 251, identifies 2021-03-22 as the backup time 252, indicates the backup was a successful backup operation for the backup status 253, and in turn, indicates that 100% of the backup data required to perform the second backup 220 was successfully stored by the object storage for the percentage (%) completed value 254.

It should be noted that the server may copy or create a new instance of a catalog (e.g. data catalog 165 and/or backup catalog 167) from the previous backup and update the entries as necessary. Accordingly, each backup (e.g. full or incremental) may be associated with a particular version or instance of the catalog. Alternatively, during each backup (e.g. full or incremental), the server may add entries (e.g. cumulatively) to a single instance of the catalog. It should also be noted that catalogs may include one or more data structures (e.g. tables) that are linked together. In addition, it should be noted that although the data catalog 165 and backup catalog 167 are shown in the form of a table, any data structure or configuration is contemplated. In addition, the data catalog 165 and backup catalog 167 may be part of the same database (e.g. table) or separate databases (e.g. tables) that are linked.

Figure 3:
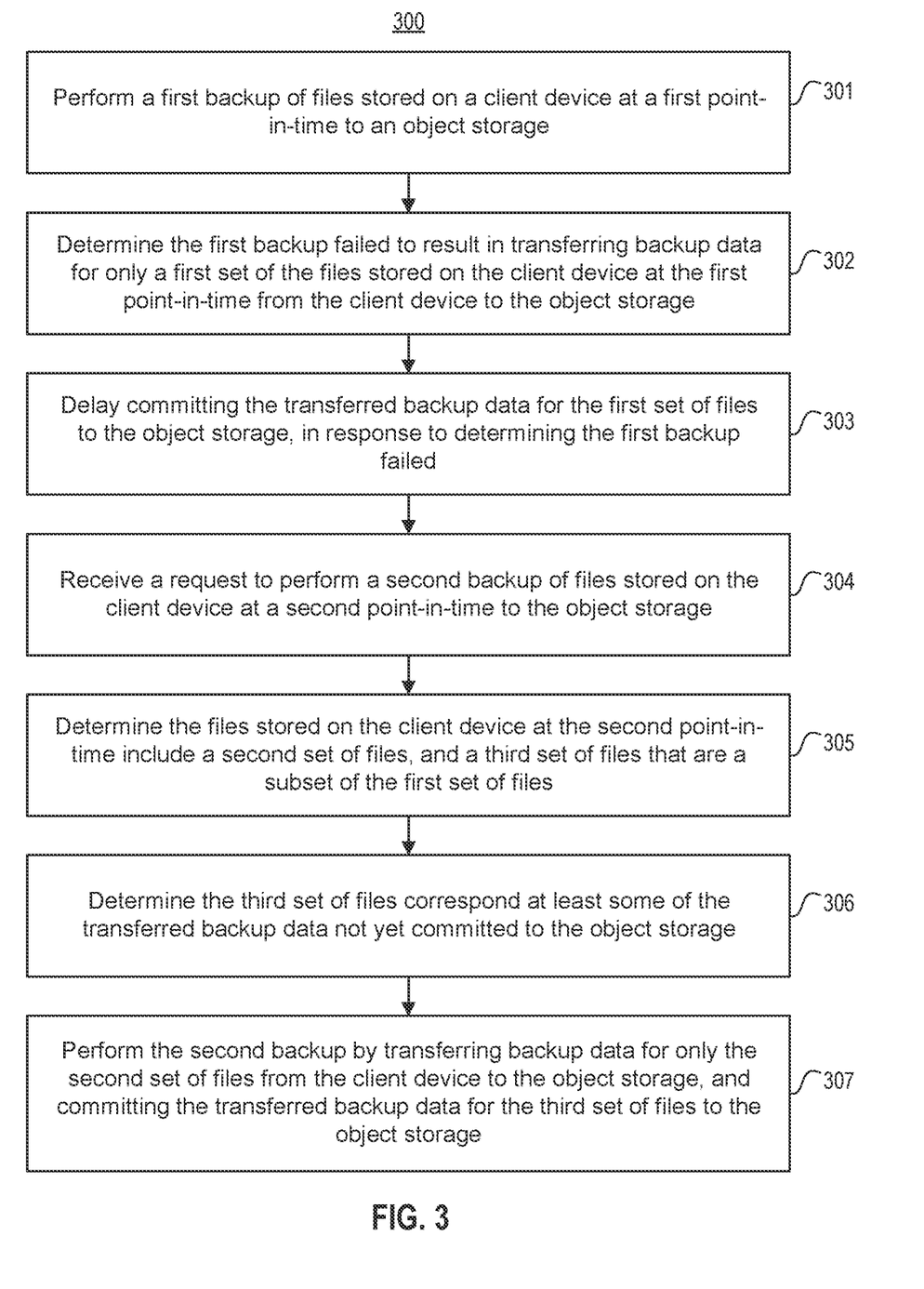
FIG. 3 is a flow diagram illustrating an example method of performing a backup by leveraging backup data transferred as part of a previously failed backup according to one or more embodiments of the disclosure

FIG. 3 is a flow diagram illustrating an example method of performing a backup by leveraging backup data transferred as part of a previously failed backup according to one or more embodiments of the disclosure. Process 300 may use processing logic, which may include software, hardware, or a combination thereof. For example, process 300 may be performed by a system including one or more components described in operating environment 100 (e.g. server 120, data manager 175, etc.).

In 301, the system (e.g. server 120) may perform a first backup of files stored on a client device (e.g. client device 110) at a first point-in-time to an object storage (e.g. object storage 150). For example, with reference to diagram 200, the system may perform (or attempt to perform) first backup 210 for files A, B, C, and D.

In 302, the system may determine the first backup failed resulting in transferring backup data for only a first set of the files stored on the client device at the first point-in-time from the client device to the object storage. For example, the backup may have failed partway through the backup operation (e.g. before completing), and thus, only the first set (or subset) of the files stored on the client device at the first point-in-time may have been transferred (e.g. backed up) to the object storage. In some embodiments, the first set of files may be a proper subset (e.g. less than all, or a portion of) of the files stored at the first point-in-time. Continuing with the example of diagram 200, the system may determine the first backup 210 failed resulting in transferring backup data for only files A, B, and C for storage onto the object storage.

In 303, the system may delay (or forego, defer, refrain, etc.) committing the transferred backup data for the first set of files to the object storage, in response to determining the first backup failed. Continuing with the example of diagram 200, in response to determining the first backup 210 failed, the system may delay committing the backup data for files A, B, and C.

Accordingly, in some embodiments, to ensure the integrity of the backup data, the system may be configured to delay committing backup data that is part of a failed backup operation. In some embodiments, the system, as part of, or in conjunction with, a backup application (or service) may be configured, by default, to not immediately rely on backup data that is transferred during a failed backup operation as a restore point. Accordingly, in some embodiments, delaying committing the transferred backup data for the first set of files to the object storage indicates the transferred backup data is not available (or usable, accessible, etc.) for use in a restore operation. However, as described herein, the system may still leverage such data in certain circumstances.

In addition, in some embodiments, delaying committing the transferred backup data for the first set of files to the object storage exposes the transferred backup data for the first set of files for removal by a garbage collection process. As referred to herein, removal of backup data (or associated object) may include operations intended to free up storage space on the object storage to reduce potential storage costs incurred by a client. For example, a removal may include the backup data (or associated object) being deleted from the object storage. As another example, removal may include moving the backup data (or associated object) to a different storage tier (e.g. archival storage tier). It should be noted that delaying a commit operation may also include completely foregoing committing certain backup data (e.g. backup data that is not associated with a subsequent backup).

In some embodiments, as part of a scheduled garbage collection process, the object storage may free up space used by non-committed data. In some embodiments, the garbage collection process may be scheduled by the system (e.g. backup application). Accordingly, in some embodiments, the system may dynamically adjust the garbage collection schedule. For example, in response to a failed backup operation, the system may delay the garbage collection for a predetermined (e.g. user-configurable) period of time. In some embodiments, backup data may be exposed for removal based on an associated expiration. For example, backup data that is not committed may be marked expired, or associated with a shorter expiration. In addition, in some embodiments, the system may dynamically adjust the expiration of backup data. For example, in response to one or more failed backup operations, the system may extend the expiration times of non-committed backup data in anticipation that such data may be leveraged for a subsequent backup.

As described the system may store specialized metadata, for example, as part of a metadata database (e.g. metadata database 160). For example, in response to determining the first backup failed, the system may store metadata to indicate that the first backup failed, and that the transferred backup data for the first set of files is associated with the first backup. Continuing with the example of diagram 200, the system may store metadata as part of a backup catalog 167 indicating that the first backup 210 failed as the backup status 253 as shown in entry 281. In addition, the system may store metadata as part of a data catalog 165 indicating that the backup data for files A, B, and C are associated with the first backup 210 as the backup ID 243 as shown in entries 271, 272, and 273A.

In addition, in some embodiments, in response to delaying committing the transferred backup data for the first set of files to the object storage, the system may store metadata to indicate that the transferred backup data for the first set of files has not been committed. Continuing with the example of diagram 200, the system may store metadata indicating that the backup data for files A, B, and C are not committed as the committed value 244 as shown in entries 271, 272, and 273A.

In 304, the system may receive a request to perform a second backup of files stored on the client device at a second point-in-time to the object storage. The second backup may be subsequent to the first backup. Continuing with the example of diagram 200, the system may receive a request to perform the second backup 220 for files C, D, and E stored on the client device at a second point-in-time subsequent (e.g. after) the first backup 210.

In 305, the system may determine the files stored on the client device at the second point-in-time include a second set of files, and a third set of files that are a subset of the first set of files. In other words, the system may determine that the files stored on the client device at the second point-in-time include a second set of files that are not a subset of the first set of files, and a third set of files that are a subset of the first set of files. Continuing with the example of diagram 200, the system may determine the files stored on the client device at the second point-in-time include files D, and E (e.g. a second set of files), and file C (e.g. a third set of files)

that are a subset of files A, B, and C (e.g. the first set of files). In some embodiments, a subset as referred to herein may include a proper subset.

Accordingly, the second set of files may include new (or updated) files that are stored on the client device since the first backup, and third set of files may include files that were already present on the client device at the first point-in-time and successfully transferred and stored by the object storage. In other words, the third set of files may include files already backed up (or attempted to be backed up) as part of the first backup.

As described, to improve backup efficiency, the system may attempt to use data that may have already been transferred to the object storage, but not yet committed to the object storage. For example, such data may include data transferred to the object storage as part of a failed backup operation.

Accordingly, in 306, the system may determine the third set of files correspond at least some of the transferred backup data not yet committed to the object storage.

When determining whether data to be backed up corresponds to non-committed backup data stored by the object storage, the system may perform various operations that leverage the stored metadata. For example, in some embodiments, in response to receiving the request to perform the second backup, the system may determine whether any previously performed backups failed by searching the stored metadata. As a result, the system may identify the first backup as a failed backup based on the stored metadata indicating that the first backup failed. Continuing with the example of diagram 200, the system may identify whether any previously performed backups failed by searching the backup catalog 167 and determining the backup status 253 associated with the first backup 210 indicates the backup failed.

In addition, in some embodiments, the system may attempt to search for non-committed backup data stored by the object storage only when it is determined a previous backup operation failed. In some embodiments, this may include determining whether a most recent backup operation failed, or a backup operation within a range of the most recent backup failed (e.g. whether any of the last 3 backup operations failed).

Accordingly, in some embodiments, determining the third set of files correspond at least some of the transferred backup data not yet committed to the object storage may include the system searching the stored metadata to identify the transferred backup data not yet committed to the object storage, in response to identifying the first backup as the failed backup. Accordingly, the system may compare backup data for the files stored on the client device at the second point-in-time with the transferred backup data not yet committed to the object storage, and determine the third set of files correspond to at least some of the transferred backup data not yet committed to the object storage based on the comparison.

Continuing with the example of diagram 200, the system may search the data catalog 165 and identify the backup data for files A, B, and C are not committed based on their associated committed value 244. Accordingly, the system may compare the backup data of files C, D, and E (e.g. the files stored on the client device at the second point-in-time) with the backup data of files A, B, and C (e.g. the transferred backup data not yet committed to the object storage), and determine that the backup data for the third set of files (e.g. backup data for file C) corresponds to (e.g. equates to) the non-committed backup data for file C already stored on the object storage as part of the first backup 210.

In 307, the system may perform the second backup by transferring backup data for only the second set of files from the client device to the object storage, and committing the transferred backup data not yet committed to the object storage that corresponds to the third set files. Accordingly, in some embodiments, the system may complete the second backup by performing a combination of transferring and storing data, and committing certain non-committed backup data. Continuing with the example of diagram 200, the system may transfer the backup data for only files D, and E (e.g. the second set of files), and instead of transferring the backup data for file C (e.g. from the client device), the system may merely commit the backup data for file C that is stored by the object storage. In some embodiments, the system may also associate with the backup data for file C with the second backup. Accordingly, in response to performing the second backup, the system may update the data catalog 165 to indicate that the backup data for file C is associated with the second backup 220, and indicate the backup data is now committed as shown in entry 273B.

In some embodiments, in response to performing the second backup, the system may commit the transferred backup for the second set of files to the object storage. In addition, the system may also update the metadata to indicate that the second backup was successful (e.g. as shown in entry 282 of diagram 200), and that the transferred backup data for the second set of files is associated with the second backup (e.g. as shown in entries 274, and 275 of diagram 200). In some embodiments, a backup that is identified as being a success, may be relied upon as a valid restore point. In other words, backup data associated with a successful backup (e.g. committed backup data) may be relied upon (e.g. by a backup application) to perform a restore operation.

Figure 4:
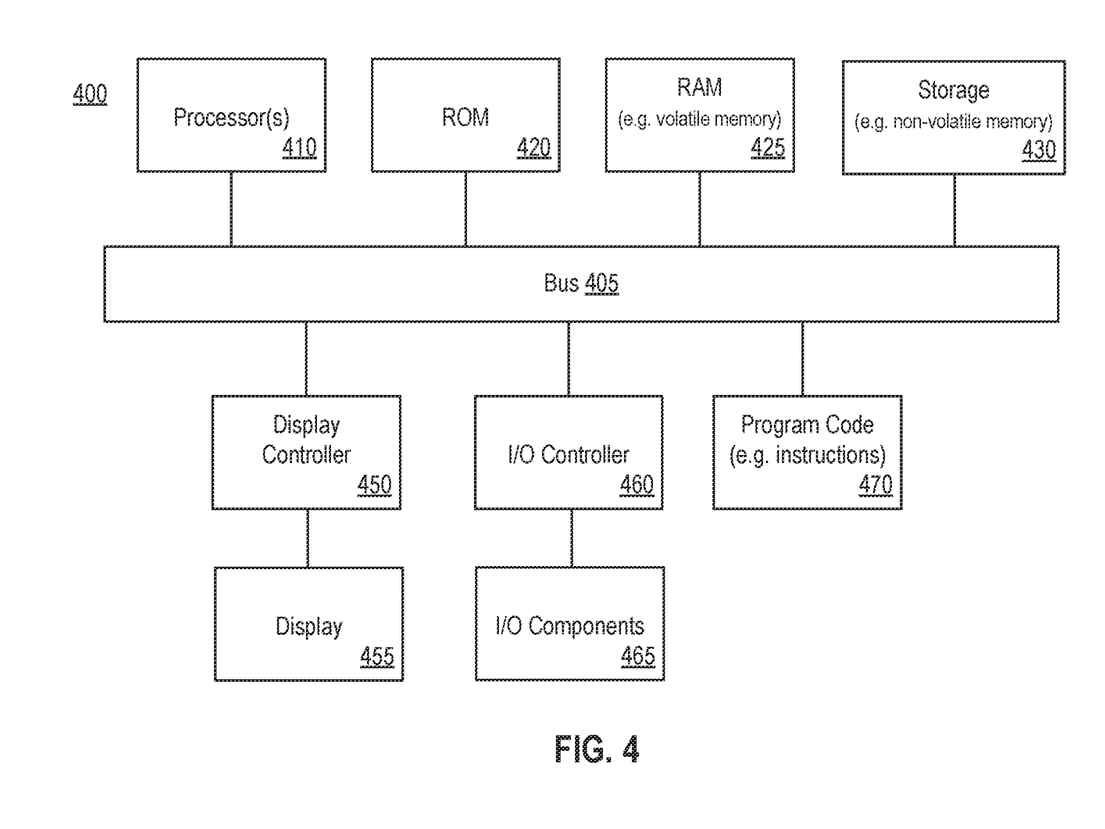
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. server 120, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. server 120, manager 175, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform a first backup of files stored on a client device at a first point-in-time to an object storage;
   determine the first backup failed resulting in transferring backup data for only a first set of the files stored on the client device at the first point-in-time from the client device to the object storage;
   delay committing the transferred backup data for the first set of files to the object storage, in response to determining the first backup failed;
   receive a request to perform a second backup of files stored on the client device at a second point-in-time to the object storage;
   determine the files stored on the client device at the second point-in-time include a second set of files, and a third set of files that are a subset of the first set of files;
   determine the third set of files correspond at least some of the transferred backup data not yet committed to the object storage; and
   perform the second backup by transferring backup data for only the second set of files from the client device to the object storage, and committing the transferred backup data not yet committed to the object storage that corresponds to the third set files.

2. The system of claim 1, wherein delaying committing the transferred backup data for the first set of files to the object storage indicates the transferred backup data for the first set of files is not available for use in a restore operation.

3. The system of claim 1, wherein the plurality of instructions, when executed, further cause the one or more processors to:
   store metadata to indicate that the first backup failed, and that the transferred backup data for the first set of files is associated with the first backup, in response to determining the first backup failed.

4. The system of claim 1, wherein the plurality of instructions, when executed, further cause the one or more processors to:
   store metadata to indicate that the transferred backup data for the first set of files has not been committed, in response to delaying committing the transferred backup data for the first set of files to the object storage.

5. The system of claim 4, wherein the plurality of instructions, when executed, further cause the one or more processors to:
   determine whether any previously performed backups failed by searching the stored metadata, in response to receiving the request to perform the second backup; and
   identify the first backup as a failed backup based on the stored metadata indicating that the first backup failed.

6. The system of claim 5, wherein determining the third set of files correspond to at least some of the transferred backup data not yet committed to the object storage includes:
   searching the stored metadata to identify the transferred backup data not yet committed to the object storage, in response to identifying the first backup as the failed backup;
   comparing backup data for the files stored on the client device at the second point-in-time with the transferred backup data not yet committed to the object storage; and
   determining the third set of files correspond to at least some of the transferred backup data not yet committed to the object storage based on the comparison.

7. The system of claim 4, wherein the plurality of instructions, when executed, further cause the one or more processors to:
   commit the transferred backup data for the second set of files to the object storage; and
   update the metadata to indicate that the second backup was successful, and that the transferred backup data for the third set of files is associated with the second backup.

8. The system of claim 1, wherein delaying committing the transferred backup data for the first set of files to the object storage exposes the transferred backup data for the first set of files for removal by a garbage collection process.

9. A method comprising:
   performing a first backup of files stored on a client device at a first point-in-time to an object storage;
   determining the first backup failed resulting in transferring backup data for only a first set of the files stored on the client device at the first point-in-time from the client device to the object storage;
   delaying committing the transferred backup data for the first set of files to the object storage, in response to determining the first backup failed;
   receiving a request to perform a second backup of files stored on the client device at a second point-in-time to the object storage;
   determining the files stored on the client device at the second point-in-time include a second set of files, and a third set of files that are a subset of the first set of files;
   determining the third set of files correspond at least some of the transferred backup data not yet committed to the object storage; and
   performing the second backup by transferring backup data for only the second set of files from the client device to the object storage, and committing the transferred backup data not yet committed to the object storage that corresponds to the third set files.

10. The method of claim 9, wherein delaying committing the transferred backup data for the first set of files to the object storage indicates the transferred backup data for the first set of files is not available for use in a restore operation.

11. The method of claim 9, further comprising:
    storing metadata to indicate that the first backup failed, and that the transferred backup data for the first set of files is associated with the first backup, in response to determining the first backup failed.

12. The method of claim 9, further comprising:
    storing metadata to indicate that the transferred backup data for the first set of files has not been committed, in response to delaying committing the transferred backup data for the first set of files to the object storage.

13. The method of claim 12, further comprising:
    determining whether any previously performed backups failed by searching the stored metadata, in response to receiving the request to perform the second backup; and
    identifying the first backup as a failed backup based on the stored metadata indicating that the first backup failed.

14. The method of claim 13, wherein determining the third set of files correspond to at least some of the transferred backup data not yet committed to the object storage includes:
    searching the stored metadata to identify the transferred backup data not yet committed to the object storage, in response to identifying the first backup as the failed backup;
    comparing backup data for the files stored on the client device at the second point-in-time with the transferred backup data not yet committed to the object storage; and
    determining the third set of files correspond to at least some of the transferred backup data not yet committed to the object storage based on the comparison.

15. A computer program product comprising a non-transitory computer-readable medium having a computer-readable program code embodied therein to be executed by one or more processors, the program code including instructions to:
    perform a first backup of files stored on a client device at a first point-in-time to an object storage;
    determine the first backup failed resulting in transferring backup data for only a first set of the files stored on the client device at the first point-in-time from the client device to the object storage;
    delay committing the transferred backup data for the first set of files to the object storage, in response to determining the first backup failed;
    receive a request to perform a second backup of files stored on the client device at a second point-in-time to the object storage;
    determine the files stored on the client device at the second point-in-time include a second set of files, and a third set of files that are a subset of the first set of files;
    determine the third set of files correspond at least some of the transferred backup data not yet committed to the object storage; and
    perform the second backup by transferring backup data for only the second set of files from the client device to the object storage, and committing the transferred backup data not yet committed to the object storage that corresponds to the third set files.

16. The computer program product of claim 15, wherein delaying committing the transferred backup data for the first set of files to the object storage indicates the transferred backup data for the first set of files is not available for use in a restore operation.

17. The computer program product of claim 15, wherein the program code includes further instructions to:

store metadata to indicate that the first backup failed, and that the transferred backup data for the first set of files is associated with the first backup, in response to determining the first backup failed.

18. The computer program product of claim 15, wherein the program code includes further instructions to:
store metadata to indicate that the transferred backup data for the first set of files has not been committed, in response to delaying committing the transferred backup data for the first set of files to the object storage.

19. The computer program product of claim 18, wherein the program code includes further instructions to:
determine whether any previously performed backups failed by searching the stored metadata, in response to receiving the request to perform the second backup; and
identify the first backup as a failed backup based on the stored metadata indicating that the first backup failed.

20. The computer program product of claim 19, wherein determining the third set of files correspond to at least some of the transferred backup data not yet committed to the object storage includes:
searching the stored metadata to identify the transferred backup data not yet committed to the object storage, in response to identifying the first backup as the failed backup;
comparing backup data for the files stored on the client device at the second point-in-time with the transferred backup data not yet committed to the object storage; and
determining the third set of files correspond to at least some of the transferred backup data not yet committed to the object storage based on the comparison.

* * * * *